Figure 1:
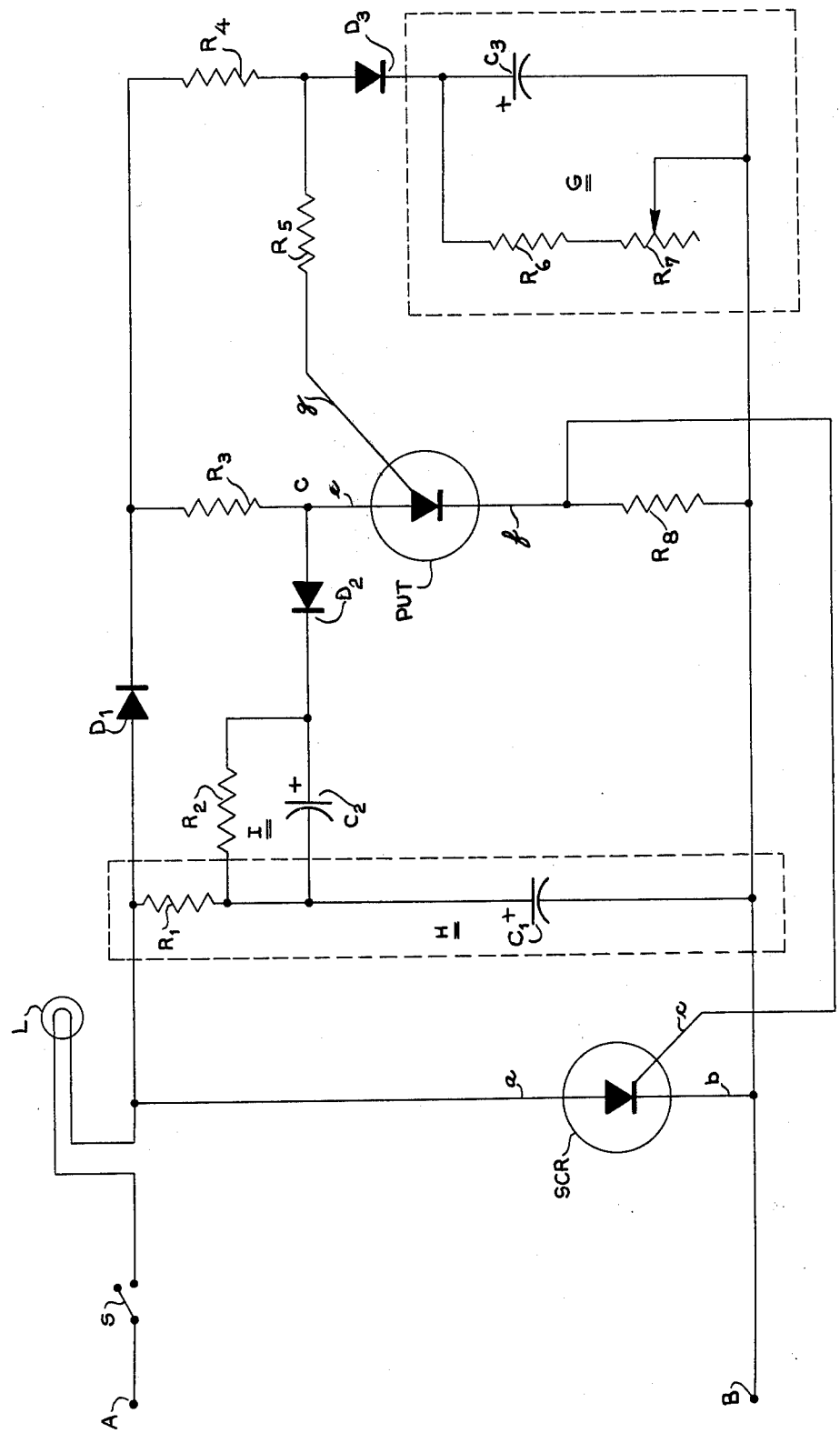

United States Patent [19]

Delpy

[11] 3,991,343
[45] Nov. 9, 1976

[54] CONTROL CIRCUIT FOR PROGRESSIVELY VARYING ILLUMINATION INTENSITY OF LAMPS

[76] Inventor: Henry Delpy, 5920 Honoré Mercier, St. Leonard, Quebec, Canada

[22] Filed: Jan. 7, 1976

[21] Appl. No.: 646,965

[52] U.S. Cl. .................. 315/194; 307/252 F; 307/252 N; 315/199; 315/296; 315/360; 323/19; 323/41
[51] Int. Cl.² ........................................ H05B 39/02
[58] Field of Search ........... 315/194, 199, 291, 296, 315/307, 360, DIG. 4; 317/141 R, 141 S, 142 R; 323/19, 41; 307/252 F, 252 N, 294

[56] References Cited
UNITED STATES PATENTS

| | | | |
|---|---|---|---|
| 3,389,328 | 6/1968 | Janson | 323/19 |
| 3,500,174 | 3/1970 | Ellerbeck | 323/41 X |
| 3,534,224 | 10/1970 | Skirpan et al. | 315/307 X |

*Primary Examiner*—Eugene La Roche

[57] ABSTRACT

A control circuit for progressively and gradually varying the illumination intensity of incandescent lamps. The circuit comprises a source of alternating current connected in series with an electric lamp load which is also in series with a silicon controlled rectifier. This silicon control rectifier is rendered conductive when its gate is actuated by a gate signal generated by a programmable unijunction transistor (PUT). The conduction of the PUT depends on the voltage applied on its gate by a gate biasing circuit connected thereto and which comprises a charging capacitor. On the other hand, a charging circuit is connected across the silicon control rectifier whereas a second charging circuit is connected between the anode of the PUT and the first-mentioned charging circuit. Thus, progressive and gradual extinction or quenching as well as progressive and gradual ignition or lightening of the electric lamp are effected by making the charging or discharging time of the first-mentioned circuit higher than the charging or discharging time of the gate biasing circuit, whereby the time intervals between which the PUT is made conductive becomes longer and longer due to the reducing difference between the voltage supplied by the biasing circuit to the gate of the PUT and the voltage on the cathode of the PUT supplied by the second-mentioned charging circuit, at each source cycle.

8 Claims, 2 Drawing Figures

CONTROL CIRCUIT FOR PROGRESSIVELY VARYING ILLUMINATION INTENSITY OF LAMPS

The present invention relates to circuits for controlling the illumination intensity of electric incandescent lamps or the like.

More particularly, the present invention is relative to a circuit especially adapted to vary in a gradual and progressive fashion the illumination intensity of the light radiated by electric lamps by controlling the amount of electric current flowing through the incandescent loads of the lamps. According to this invention, the circuit thus allows the lamp illumination intensity to change gradually and progressively from full brightness to complete extinction and thereupon to return gradually and progressively to its full brightness condition, this on-off cycle being furthermore automatically resumed.

Several circuits are known in the art to perform the turning on and off, in a cyclical manner, electric lamps or bulbs. For example, such prior circuits are described in U.S. Pat. No. 3,265,907 issued on Aug. 9, 1966 to Kurata et al; in U.S. Pat. No. 3,300,711 delivered on Jan. 24, 1967 to Duncan; in U.S. Pat. No. 3,331,013 issued on July 11, 1967 to Cunningham; in U.S. Pat. No. 3,358,186 delivered to Nomura on Dec. 12, 1967; in U.S. Pat. No, 3,728,713 issued on Apr. 17, 1973 to Alten; in U.S. Pat. No. 3,737,731 delivered to Zeewy on June 5, 1973; and U.S. Pat. No. 3,753,039 issued on Aug. 14, 1973 to Bonazoli et al. Those known circuits are useful for controlling the alternating or continuous current supplied to lamp loads, but in an instantaneous fashion, and are therefore commonly labelled as dimming or flashing circuits and consequently they cannot be used for the purpose of progressively and gradually varying the illumination intensity of lamps.

A prime object of the present invention resides in a circuit for progressively and gradually varying the illumination intensity of electric lamps through controlling the current intensity flowing through the lamp loads.

A particular application of the circuit according to this invention, consists in creating varying light illumination effects onto or in conjunction with any advertisement means constituted, for instance, of graphic illustrations, diagrams or designs, for the purpose of attracting people's eyes or of producing pleasant luminous effects. In this respect, a particularly outstanding and pleasant effect is produced when colored lamps or bulbs are utilized, the illumination brightness of which is progressively and gradually varied, especially when several circuits of the type according to the present invention are employed. The several circuits are then preferably parallely interconnected and each circuit will serve to progressively light on and off one or more lamps of a different color to create continuously moving light patterns of various color effects owing to the intermixing of the light color of the various lamps utilized. This moving light color effect is particularly emphasized when one or more lamps of a given color, associated with a control circuit in accordance with the present invention, are progressively turned on and off at time intervals different from the time intervals of the other parallely connected circuits associated each with lamps of other colors. Such outphasing in the energization of lamps of various colors thereby results in producing moving light patterns not only composed of the basic color of the individual lamps but also of colors modulated by the nature and the brightness of two or more differently colored lamps. As a result, a light pattern of continuously varying and moving colors is effectively produced.

Another object of the present invention therefore resides in creating a light pattern of continuously varying and moving colors by using two or more parallely connected circuits wherein each circuit is adapted to energize lamps of a given color to control the illumination intensity thereof in a progressive and gradual manner and according to a time interval which is different from time intervals at which the lamps of other colors associated with the other circuits are energized.

Therefore, the circuit in accordance with the present invention comprises a source of alternating current connected in series with an electric lamp load which is also in series with a silicon controlled rectifier. This silicon control rectifier is rendered conductive when its gate is actuated by a gate signal generated by a programmable unijunction transistor (PUT). The conduction of the PUT depends on the voltage applied on its gate by a gate biasing circuit connected thereto and which comprises a charging capacitor. On the other hand, a charging circuit is connected across the silicon control rectifier whereas a second charging circuit is connected between the anode of the PUT and the first-mentioned charging circuit. Thus, progressive and gradual extinction or quenching as well as progressive and gradual ignition or lightening of the electric lamp are effected by making the charging or discharging time of the first-mentioned circuit higher than the charging or discharging time of the gate biasing circuit, whereby the time intervals between which the PUT is made conductive becomes longer and longer due to the reducing difference between the voltage supplied by the biasing circuit to the gate of the PUT and the voltage on the cathode of the PUT supplied by the second-mentioned charging circuit, at each source cycle.

Figure 2:
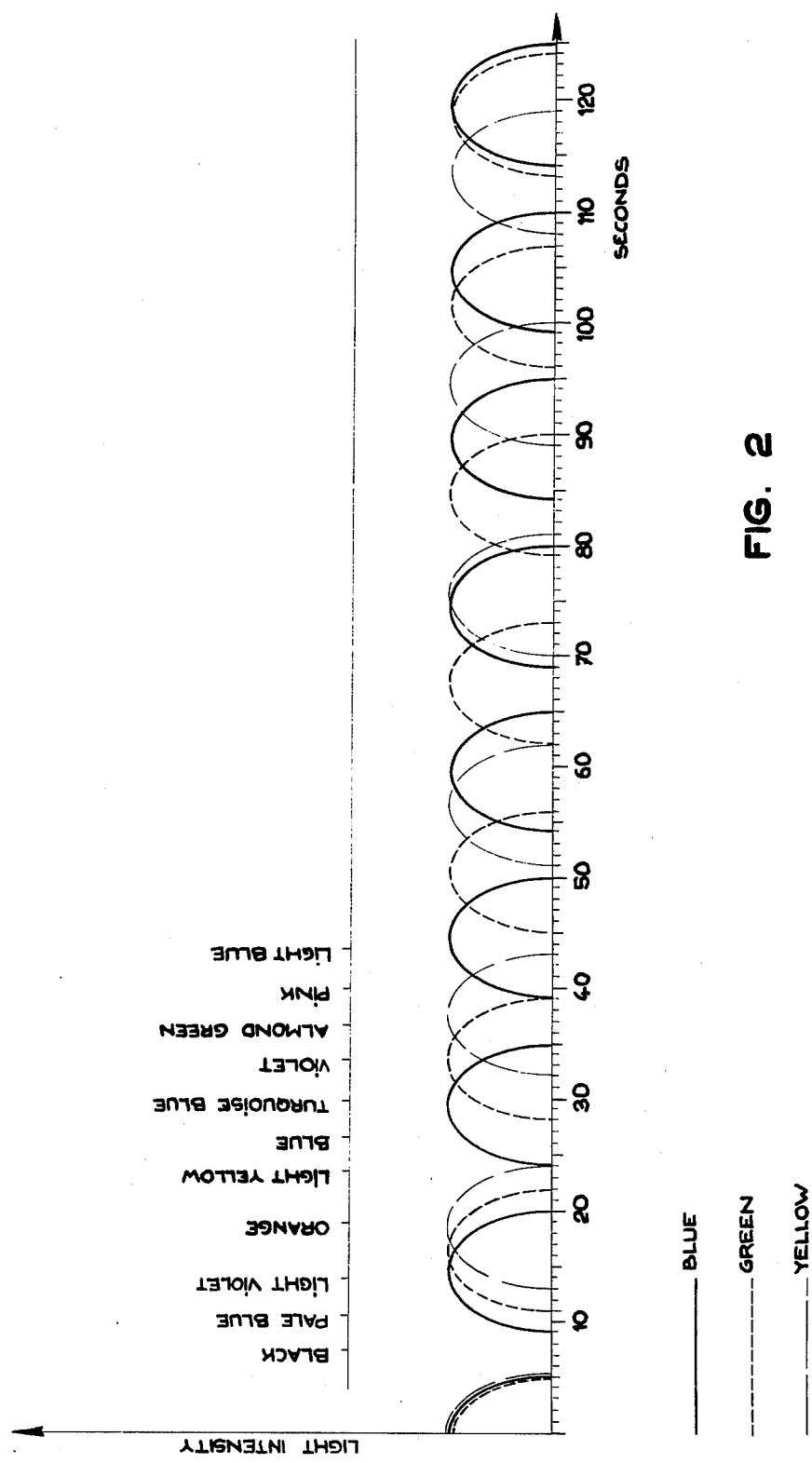

Preferred embodiments of the present invention will be hereinafter described with reference to the accompanying drawing, wherein FIG. 1 illustrates a schematic diagram of a light intensity control circuit in accordance with the present invention; and FIG. 2 shows the spectrum of light colors obtained when utilizing lamps of three different colors, where the intensity of one or more lamps of a given color is being controlled by one individual circuit of FIG. 1, three such circuits being so used to produce the desired light effects.

Referring to FIG. 1, there is shown a circuit in accordance with the present invention able to control illumination intensity of the lamp in order to vary progressively and gradually the current flowing through the lamp load. The circuit is fed with alternating current through terminals "A" and "B", the current supply source being any convention and standard mains such as of 110 volts at 60 hertz. An incandescent lamp "L" has one of its load terminals connected to input terminal "A" when on-off switch "S" is closed and the other terminal connected to the anode $a$ of a silicon controlled rectifier SCR the cathode $b$ of which is linked to the other input terminal "B". Although only a single lamp is illustrated, a plurality of lamps, serially or parallely interconnected, may as well be utilized, the number of lamps being only restricted by the breakdown current characteristics of the SCR.

A programmable unijunction transistor PUT, when conductive, delivers a gate signal through its cathode $f$ which is connected to terminal "B" by means of a resistor $R_8$. The voltage drop in resistor $R_8$ triggers the gate $c$ of the SCR which then becomes conductive. It is to be noted that the value of resistor $R_8$ in the trigger circuit is kept low enough to prevent the DC voltage at the gate from exceeding the minimum gate triggering voltage for the SCR, in order to avoid excessive interbase current in the SCR. As noted, the PUT is in its conduction state whenever the voltage and its anode $e$ exceeds the voltage on the gate electrode $g$, the PUT being otherwise in a non-conduction state. The gate $g$ is serially connected to a voltage divider formed of resistors $R_4$ and $R_5$ and the junction point of resistors $R_4$ and $R_5$ is connected to the gate charging circuit "G" through diode $D_3$. This gate biasing circuit "G" is constituted of an electrolytic capacitor $C_3$ connected across series resistors $R_6$ and $R_7$ and has a charging time which is determined by capacitor $C_3$ and resistors $R_6$ and $R_7$. Thus, the charging of capacitor $C_3$ will, on the one hand, increase the voltage applied on gate $g$ of the PUT whereas the discharging $C_3$ through resistors $R_6$ and $R_7$ will, on the other hand, provoke a decrease of the PUT gate voltage. In order to set the charging and discharging time of a circuit "G" to a desired value, the resistor $R_7$ is made variable and has its wiper directly connected to terminal "B".

As mentioned previously, the PUT is conductive whenever the difference between the anode voltage and the gate voltage thereon is positive, which means that the voltage at junction point "C" has to exceed the gate voltage generated by circuit "G" to cause conduction of the PUT. To produce the required voltage at junction "C", a charging circuit "H", having a charging time determined by serially connected capacitor $C_1$ and resistor $R_1$, is provided in parallel with the SCR terminals; and so is another charging circuit "I" constituted of capacitor $C_2$ in parallel with resistor $R_2$. This circuit "I" is, on the one hand, connected to the junction terminal of resistor $R_1$ and capacitor $C_1$ and, on the other hand, connected to the cathode of diode $D_2$ the anode of which is linked to the anode of PUT at "C". A current limiting resistor $R_3$ is connected between terminal "C" and the junction terminal of a half-wave rectifying diode $D_1$ having its anode connected to resistor $R_1$, and to resistor $R_4$.

An important characteristic of the control circuit shown in FIG. 1 resides in the proper determination of the charging and discharging time of circuit "H". Indeed, it has been found that progressive and gradual illumination of lamp "L" is effectively achieved when the charging and discharging time of charging circuit "H" substantially exceeds the charging and discharging time of biasing circuit "G", that difference in charging times defining the time intervals during which the PUT is in its conduction or non-conduction state. Thus, by making the charging time of circuit "G" lower than that of circuit "H", the rate at which the voltage build-up at the edge electrode of the PUT is kept lower than the rate at which the PUT anode voltage is increasing, thereby properly controlling the time interval defining conduction or non-conduction of the PUT and hence the illumination intensity of lamp L in terms of current flowing through its resistive load.

Initially, each capacitor $C_1$, $C_2$ and $C_3$ is uncharged, and, upon actuation of switch "S", an alternating voltage is supplied to the control circuit of FIG. 1. Then, capacitor $C_2$ of charging circuit "I" is rapidly charged and a positive voltage is impressed upon the anode of the PUT which thus becomes conductive. A gate signal is generated at the cathode of the PUT to trigger the gate electrode of the SCR and to cause a current flowing through the load of lamp L which is then illuminated to its full brightness. On the other hand, charges are building up on capacitors $C_1$ and $C_3$ so that the voltage difference between the anode voltage and gate voltage of the PUT is constantly decreasing until the PUT is fully and completely turned off. Moreover, as capacitor $C_1$ is charged more rapidly than capacitor $C_3$, owing to the respective charging time of circuits "H" and "G", the turning-on time of the PUT is delayed at each successive source cycle, thereby gradually and progressively, decreasing the illumination intensity of the lamp "L" until its complete extinction is reached. The PUT being in its non-conduction state, the capacitors $C_1$ and $C_3$ are discharged. But, owing to their respective time constant, the capacitor $C_l$ is discharging at a rate exceeding that of capacitor $C_3$, and therefore the PUT becomes conductive and serves to unblock the SCR. And, as the voltage difference between the anode voltage and the gate voltage of the PUT is progressively increasing, the time interval during which the PUT is non-conductive becomes smaller and smaller and hence, the lightening of the lamp "L" is progressively and gradually increased to full brightness. Thereupon, the progressive extinction and lightening operation of the lamp is automatically resumed following the above-described operation cycle.

It appears in order to indicate the typical experimental values of the components used in the circuitry shown in FIG. 1, which are as follows:

$R_1$ = 220 Kohms
$R_2$ = 22 Kohms
$R_3$ = 100 Kohms
$R_4$ = 196 Kohms
$R_5$ = 100 Kohms
$R_6$ = 200 Kohms
$R_7$ = 0 – 100 Kohms
$R_8$ = 1 Kohm
$C_1$ = 50$\mu$F, 50 V
$C_2$ = 10$\mu$F, 10 V
$C_3$ = 10$\mu$F, 50 V
SCR = type ECG 5455 made by General Electric Company
PUT = type ECG 6502 made by General Electric Company
$D_1$, $D_2$ and $D_3$ = type 1N 5393 made by General Electric Company Each single control circuit shown in FIG. 1, is able to produce one of the light waves illustrated in FIG. 2. The particular purpose of FIG. 2 resides in illustrating an especially interesting application of the basic circuit in accordance with the present invention when, for instance, three such circuits are used in parallel, each serving to control the illumination intensity of a lamp or group of lamps of a specific color. So, when three circuits are used to progressively and gradually energize and deenergize blue lamps, green lamps and yellow lamps, respectively, a continuously varying and moving pattern of light colors results due to the continuous mixing and modulation of the three basic colors, the intensity and energization time of which individually vary in time. The operation cycle of each individual circuit, and thus the illumination cycles of the lamps associated with one circuit, is made different from that of the other circuits merely by setting the value of the variable resistor $R_7$ of the biasing circuit "G" so as to particularize the time constant of that circuit "G". Obviously, the resulting spectrum of light colors may be varied at infinity since the illumination cycle of each circuit essentially relies upon a given value selected on variable resistor $R_7$.

It is understood that the above description is not construed to be limitative, but that several modifications to the described embodiments could be made without departing from the scope of the present invention which is defined in the following claims.

I claim:
1. A circuit for progressively and gradually controlling an electric current flowing through incandescent lamp loads, comprising:
   a source of alternating current,
   a silicon control rectifier having anode, cathode and gate electrodes, said anode electrode being connected in series with at least one of said lamp loads, both being connected across said source,
   a programmable unijunction transistor having anode, cathode and gate electrodes for generating, when made conductive, a gate signal through the cathode thereof to the gate of said silicon control rectifier,
   a capacitance-resistance biasing circuit connected to the gate of said programmable unijunction transistor, said biasing circuit having a first predetermined charging time,
   a charging circuit connected between the anode and cathode of said silicon control rectifier and having a second predetermined charging time,
   another charging circuit connected to the anode of the programmable unijunction transistor through a diode and to said charging circuit,
   the charging time of said charging circuit being higher than the charging time of said gate biasing circuit so that the current flowing through the lamp load is progressively and gradually decreased at each cycle of said alternating current source till null, and afterwards is increased to its full intensity, such increase and decrease in the current intensity being cyclically and automatically resumed.

2. A control circuit as claimed in claim 1, wherein said gate biasing circuit comprises a capacitor connected across a resistor which is in series with a variable resistor the wiper of which is connected to one terminal of said capacitor and to the cathode of said silicon control rectifier, the other terminal of said capacitor being connected to the gate of the programmable unijunction transistor through a second diode and a second resistor, and wherein the charging circuit comprises a second capacitor in series with a third resistor at the junction point of which is connected said another charging circuit.

3. A control circuit as claimed in claim 2, wherein the anode of the silicon control rectifier is connected to the anode of the programmable unijunction transistor through a third diode and a fourth resistor and, wherein the cathode of the silicon control rectifier is connected to the cathode of the programmable unijunction transistor through a fifth resistor.

4. A control circuit as claimed in claim 2, wherein a fifth resistor is connected between said second diode and said third diode, and wherein said another charging circuit comprises a third capacitor in parallel with a sixth resistor.

5. A circuit for progressively and gradually controlling an electric current flowing through color lamp loads by means of parallely connected circuit units fed by a common source of alternating current, each circuit unit comprising
   a silicon control rectifier having anode, cathode and gate electrodes, said anode electrode being connected in series with at least one of said lamp loads, both being connected across said source,
   a programmable unijunction transistor having anode, cathode and gate electrodes for generating, when made conductive, a gate signal through the cathode thereof to the gate of said silicon control rectifier,
   a capacitance-resistance biasing circuit connected to the gate of said programmable unijunction transistor, said biasing circuit having a first predetermined charging time,
   a charging circuit connected between the anode and cathode of said silicon control rectifier and having a second predetermined charging time,
   another charging circuit connected to the anode of the programmable unijunction transistor through a diode and to said charging circuit
   the charging time of said charging circuit being, in each circuit unit, higher than the charging time of said gate biasing circuit whereas the charging time of each biasing circuit is different from that of the other charging circuits, so that the current flowing through the lamp load in each circuit unit is progressively and gradually decreased at each cycle of said alternating current source till null, and afterwards is increased to its full intensity, such increase and decrease in the current intensity being cyclically different for each circuit unit and automatically resumed for all circuit units.

6. A control circuit as claimed in claim 5, wherein said gate biasing circuit comprises a capacitor connected across a resistor which is in series with a variable resistor of a value which differs in each circuit unit and the wiper of which is connected to the terminal of said capacitor and to the cathode of said silicon control rectifier, the other terminal of said capacitor being connected to the gate of the programmable unijunction transistor through a second diode and a second resistor, and wherein the charging circuit comprises a second capacitor in series with a third resistor at the junction point of which is connected said another charging circuit.

7. A control circuit as claimed in claim 6, wherein the anode of the silicon control rectifier is connected to the anode of the programmable unijunction transistor through a third diode and a fourth resistor and, wherein the cathode of the silicon control rectifier is connected to the cathode of the programmable unijunction transistor through a fifth resistor.

8. A control circuit as claimed in claim 7, wherein a fifth resistor is connected between said second diode and said third diode, and wherein said another charging circuit comprises a third capacitor in parallel with a sixth resistor.

* * * * *